Feb. 14, 1967   M. T. COFFMAN   3,304,123
SIDE CUTTING MINING MACHINE HAVING SWINGABLE AUGERS
Filed July 20, 1965   11 Sheets-Sheet 2
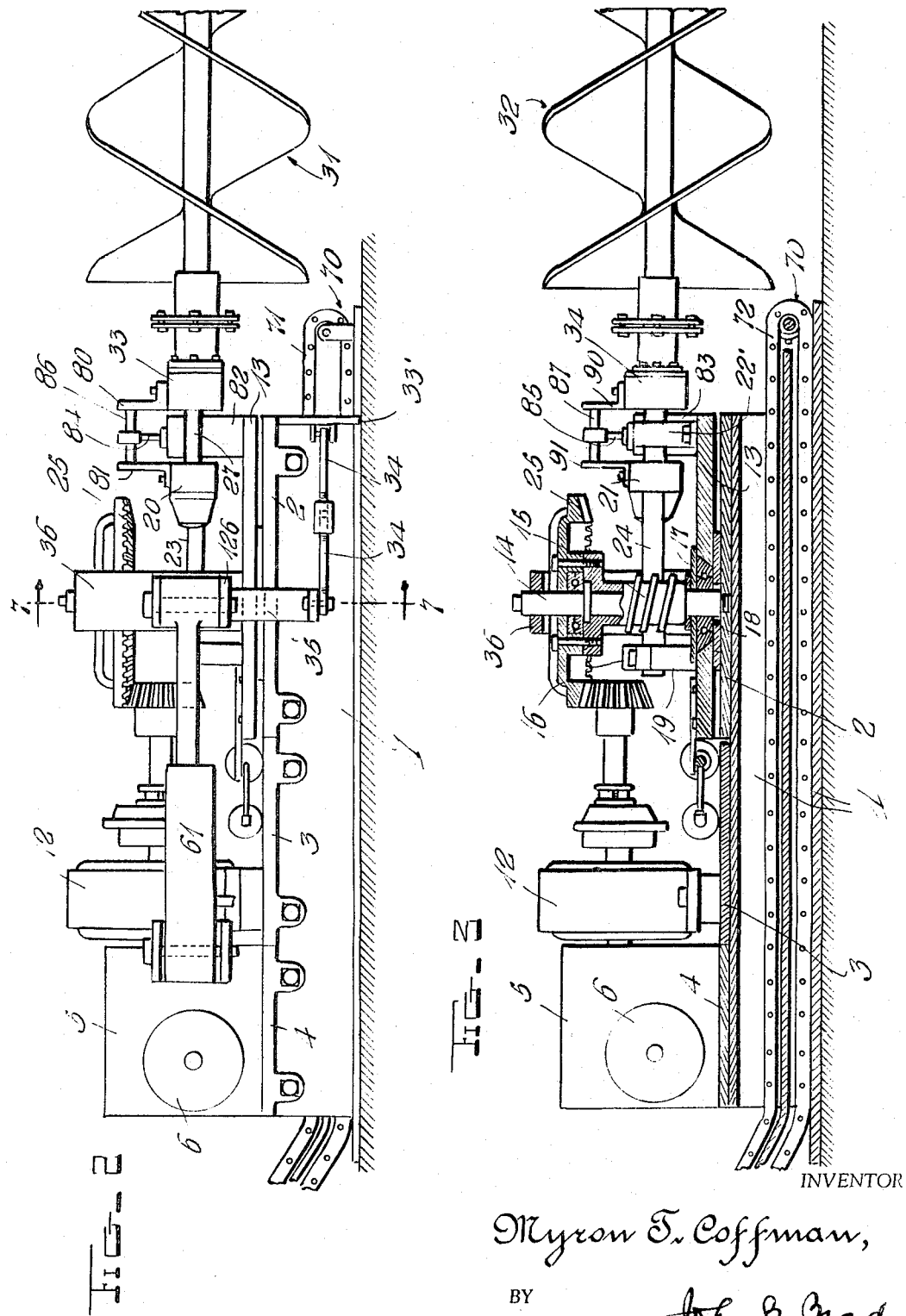
INVENTOR
Myron T. Coffman,
BY
John B. Brady
ATTORNEY Feb. 14, 1967  M. T. COFFMAN  3,304,123
SIDE CUTTING MINING MACHINE HAVING SWINGABLE AUGERS
Filed July 20, 1965  11 Sheets-Sheet 3
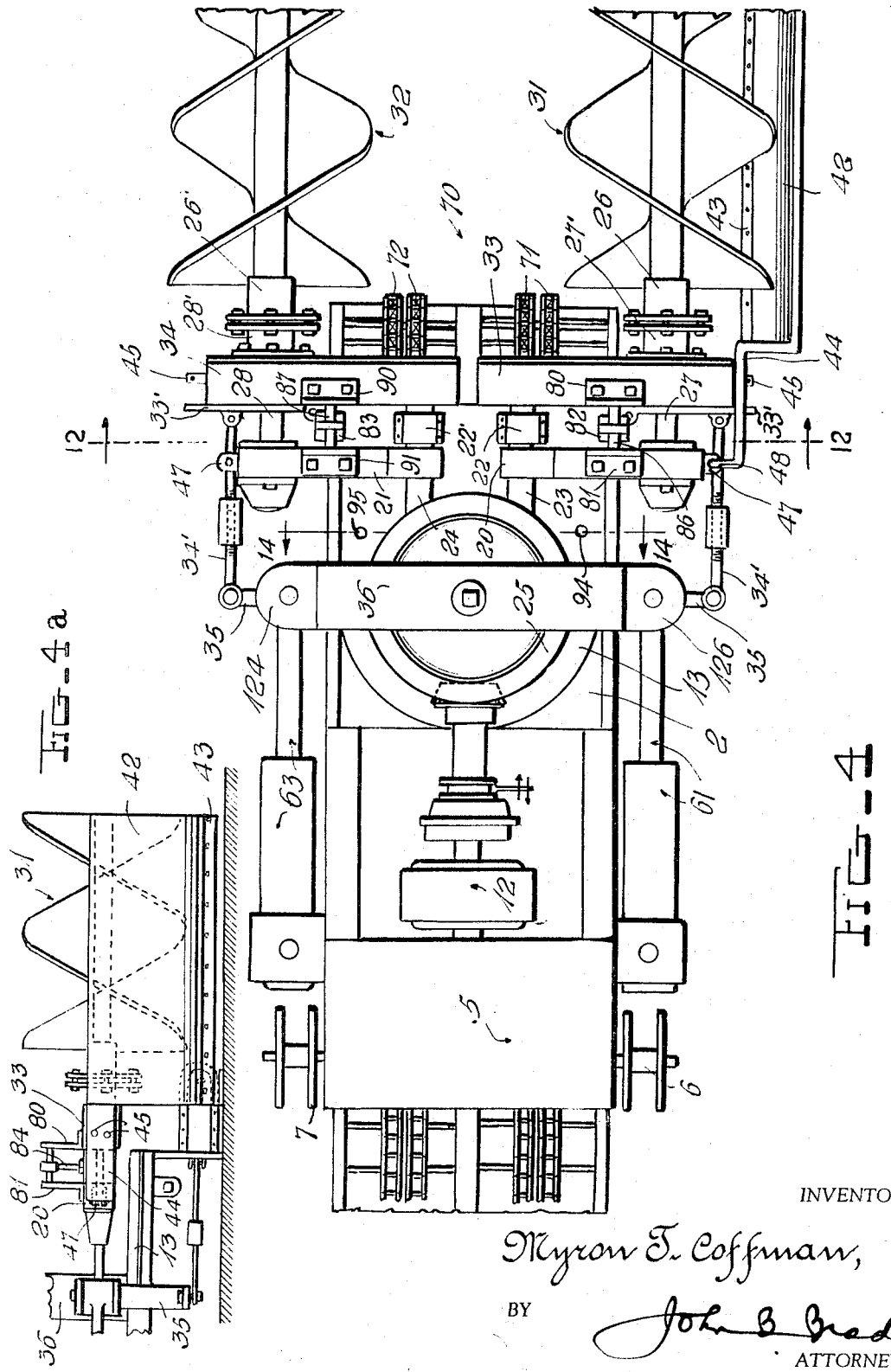
INVENTOR
Myron T. Coffman,
BY
John B. Brady
ATTORNEY

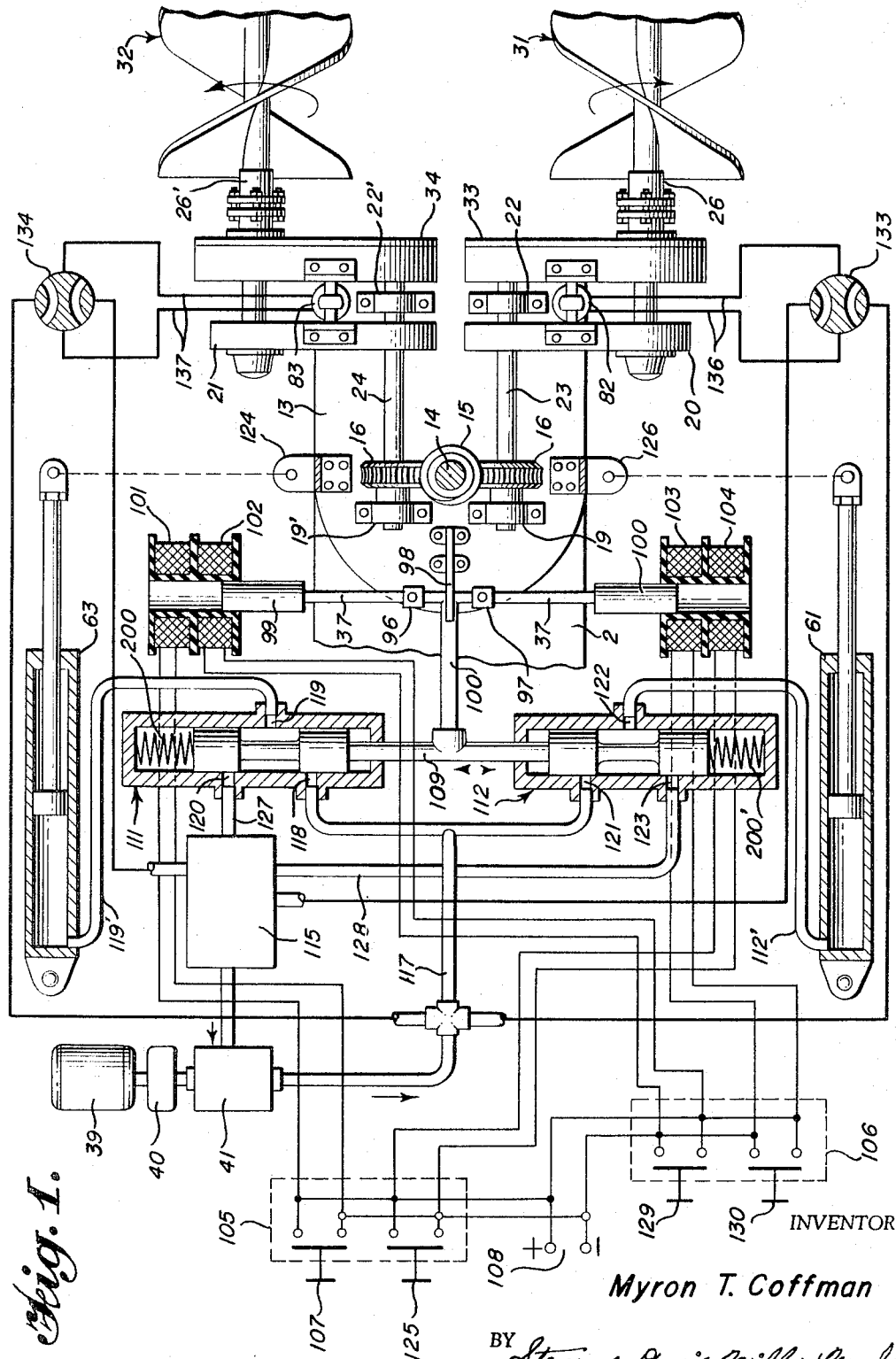

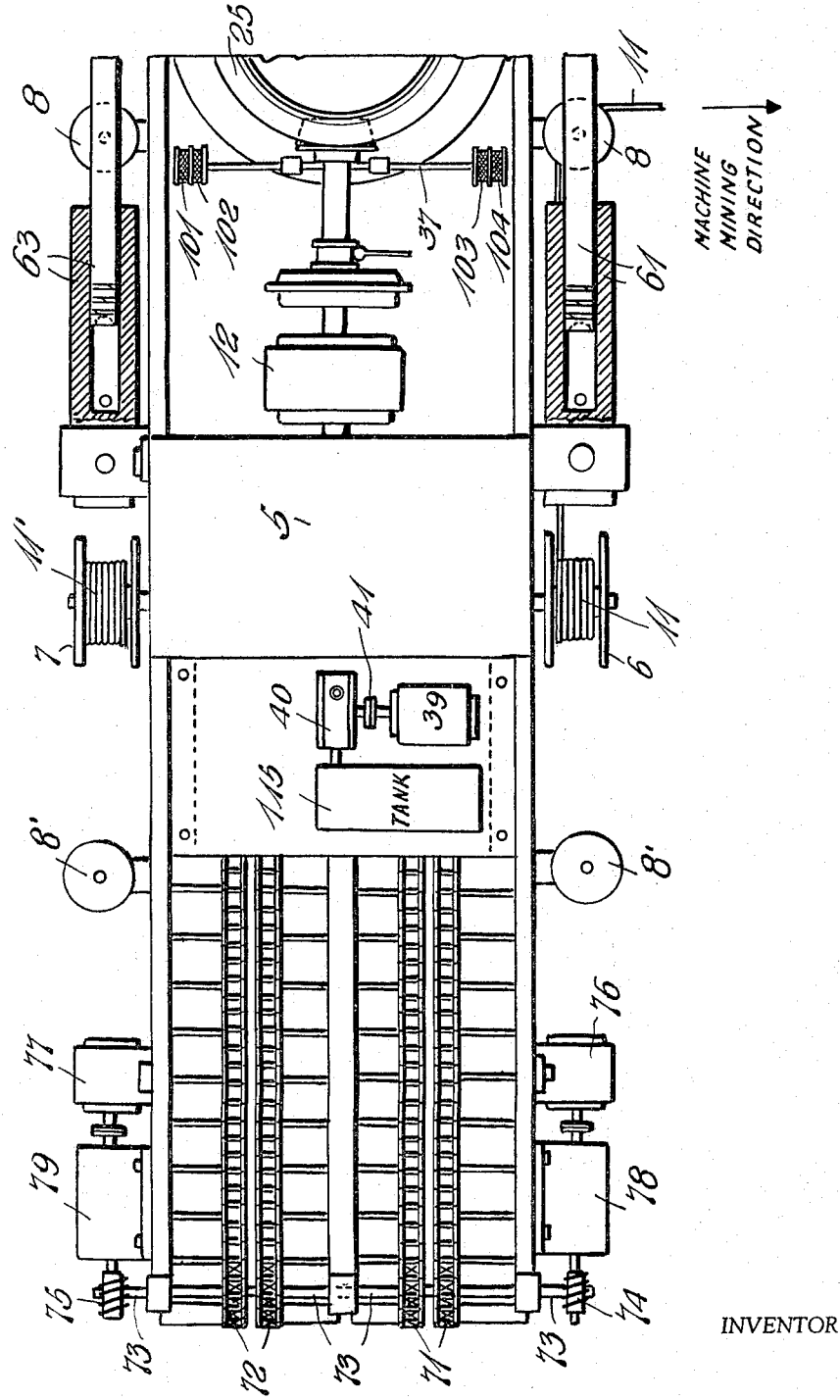

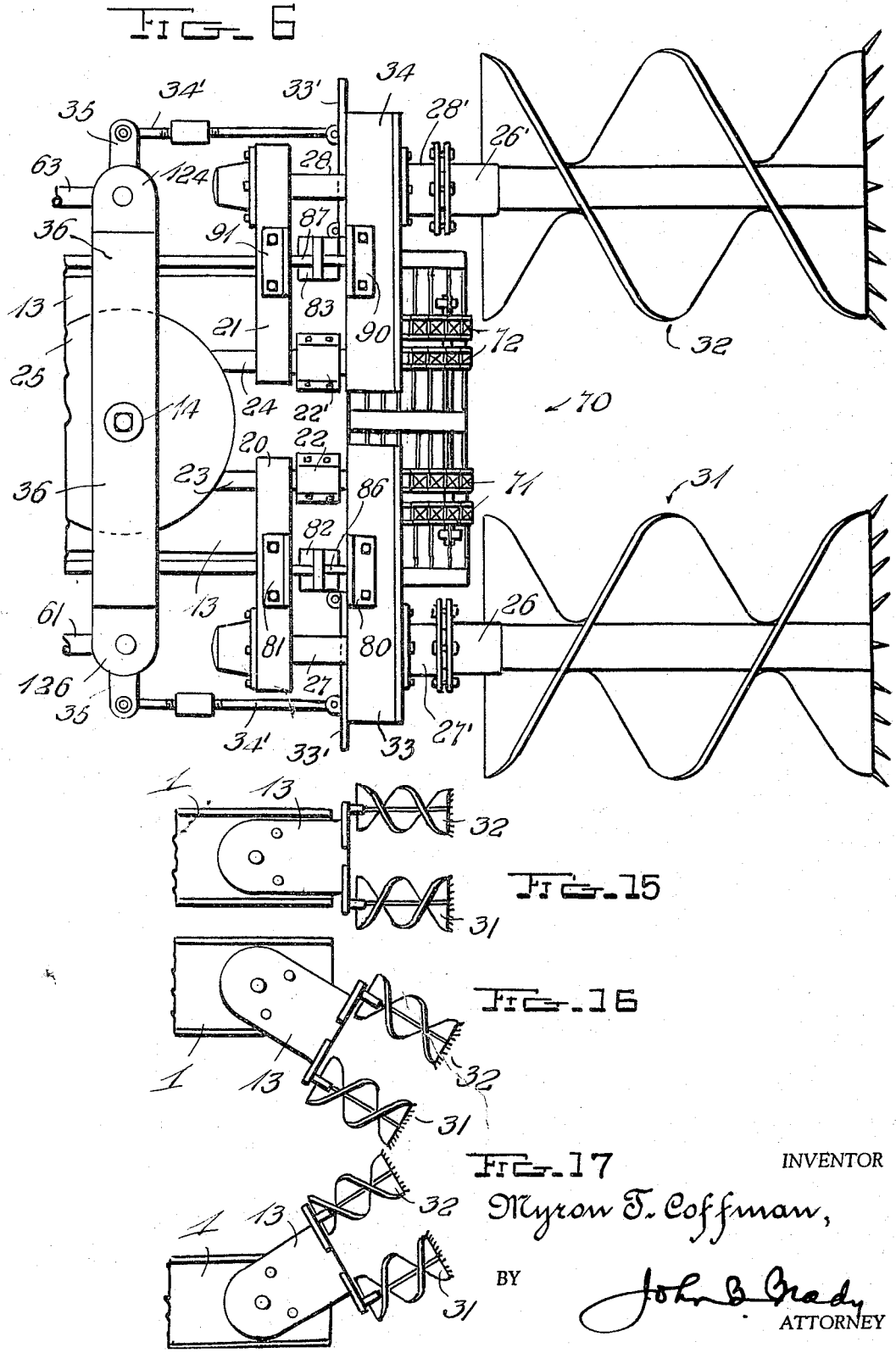

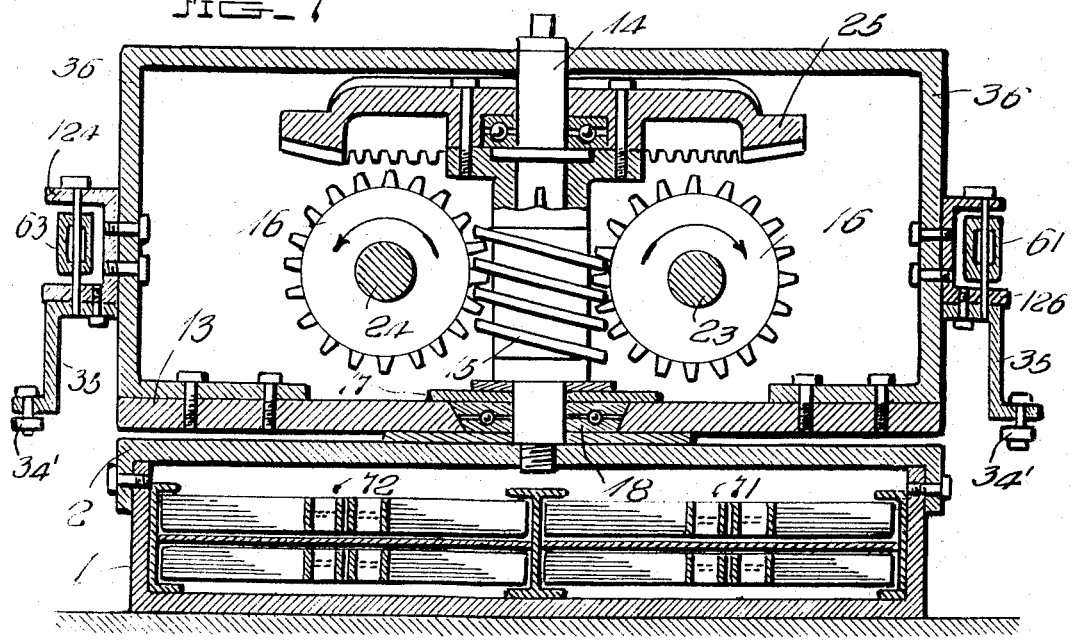
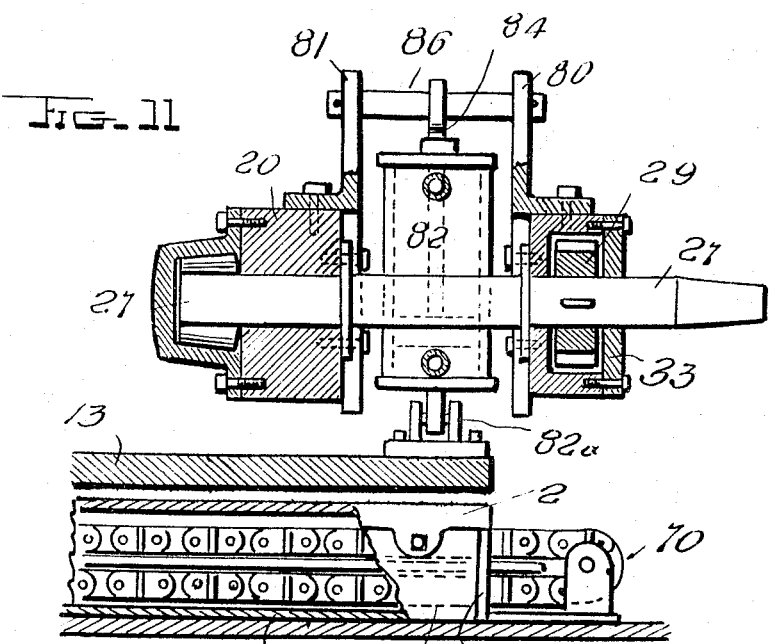
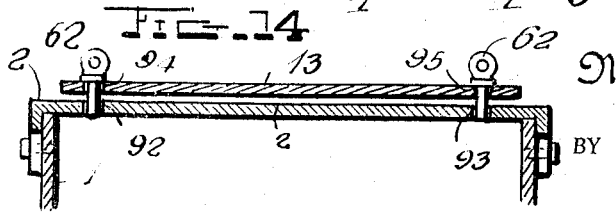

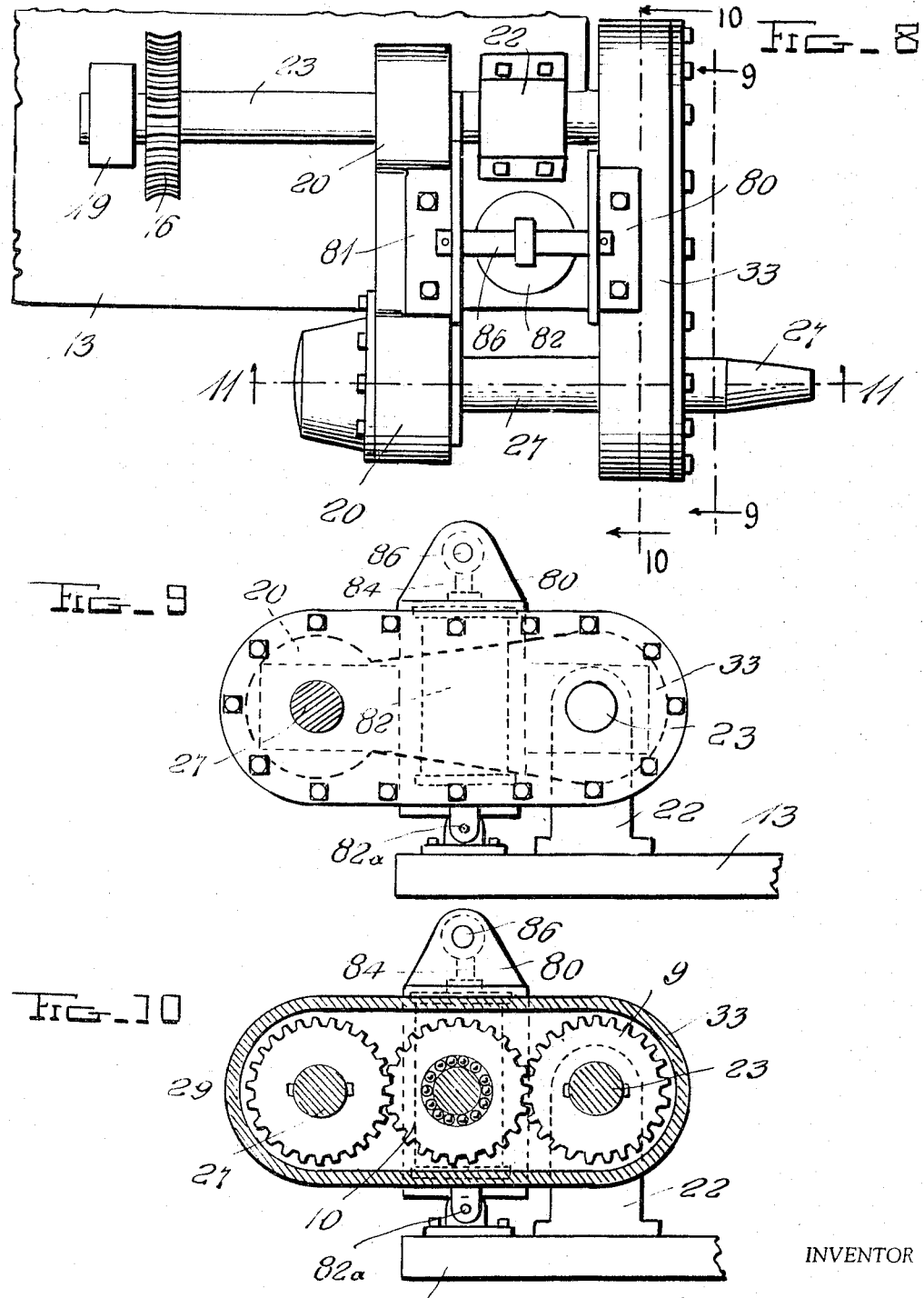

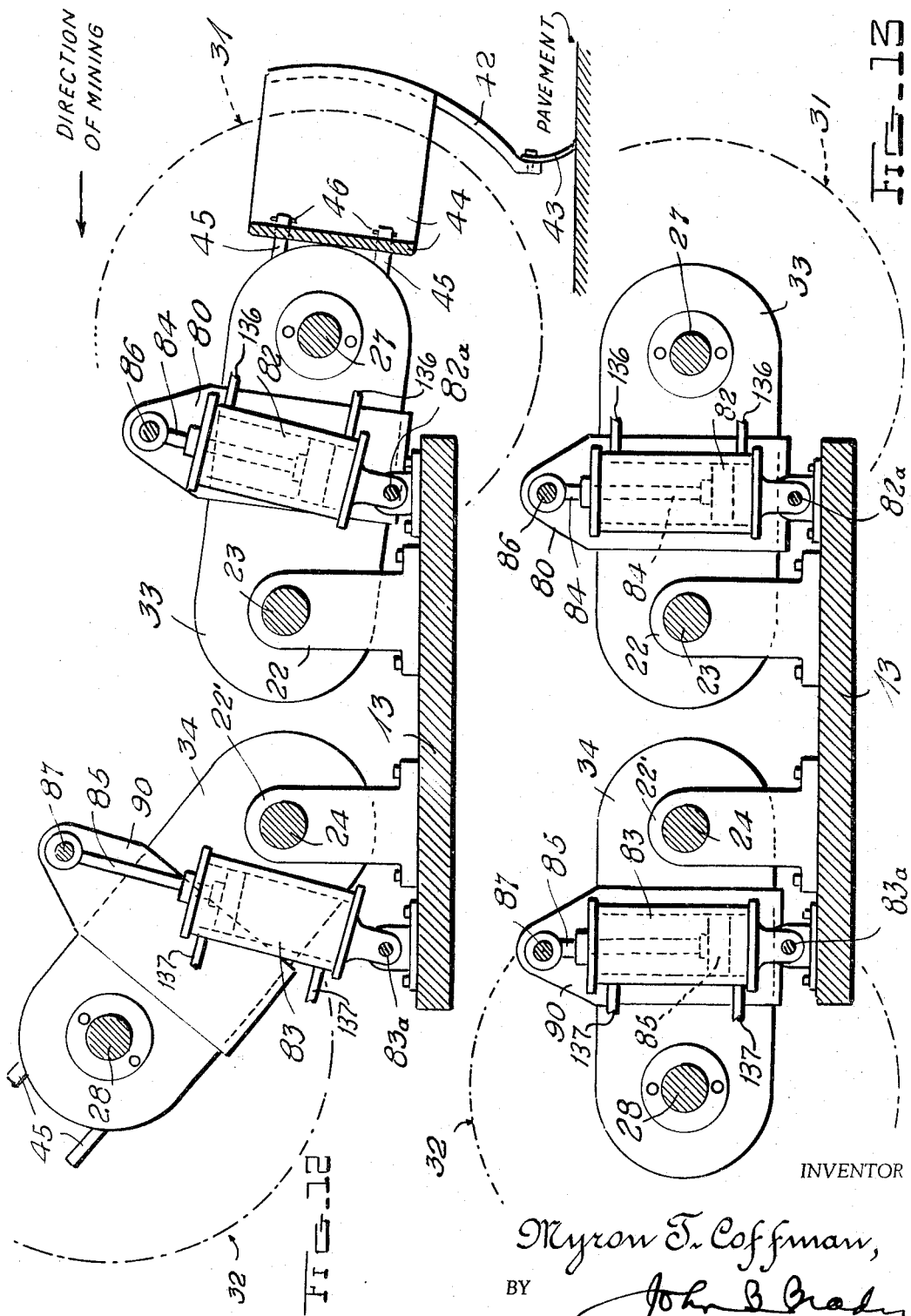

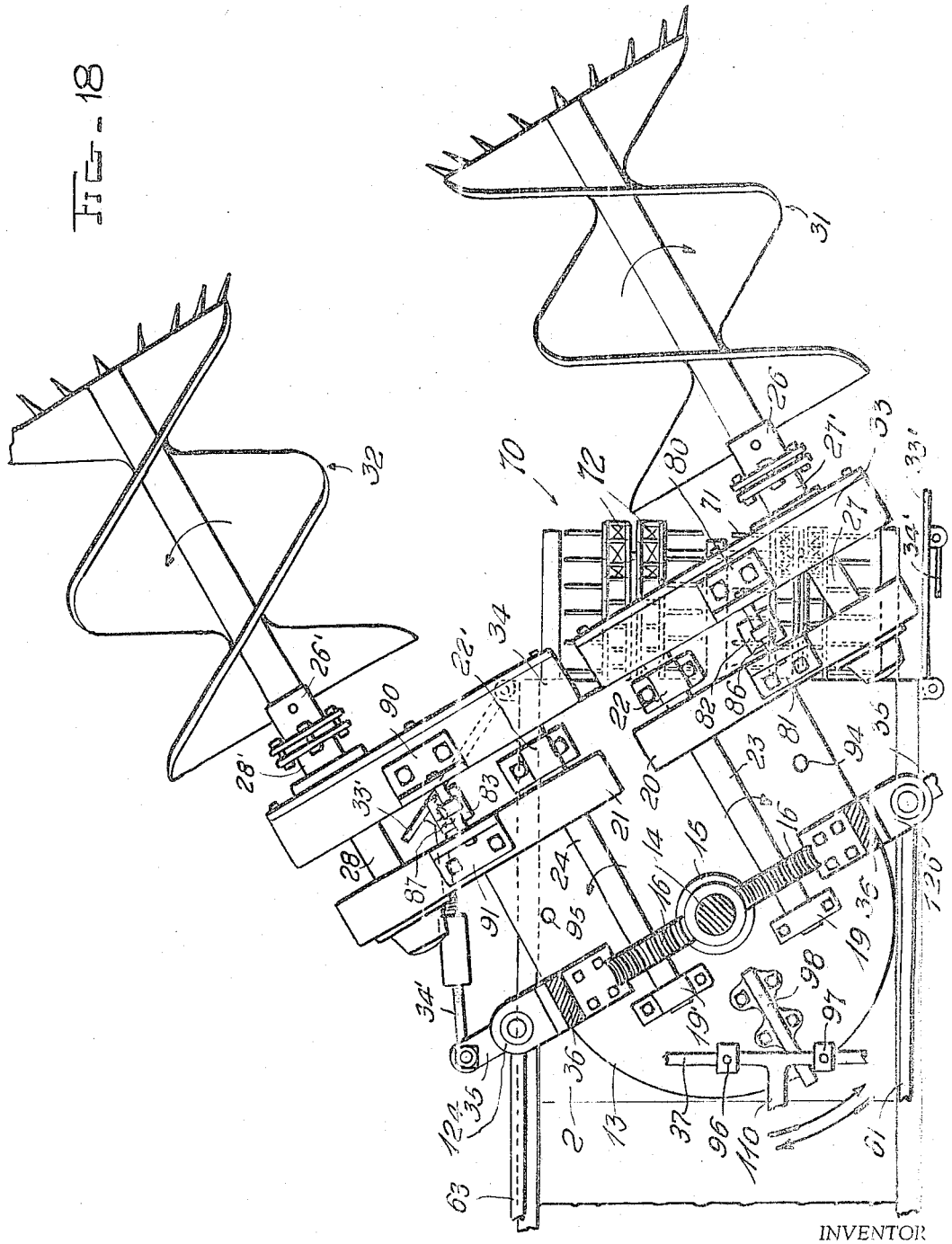

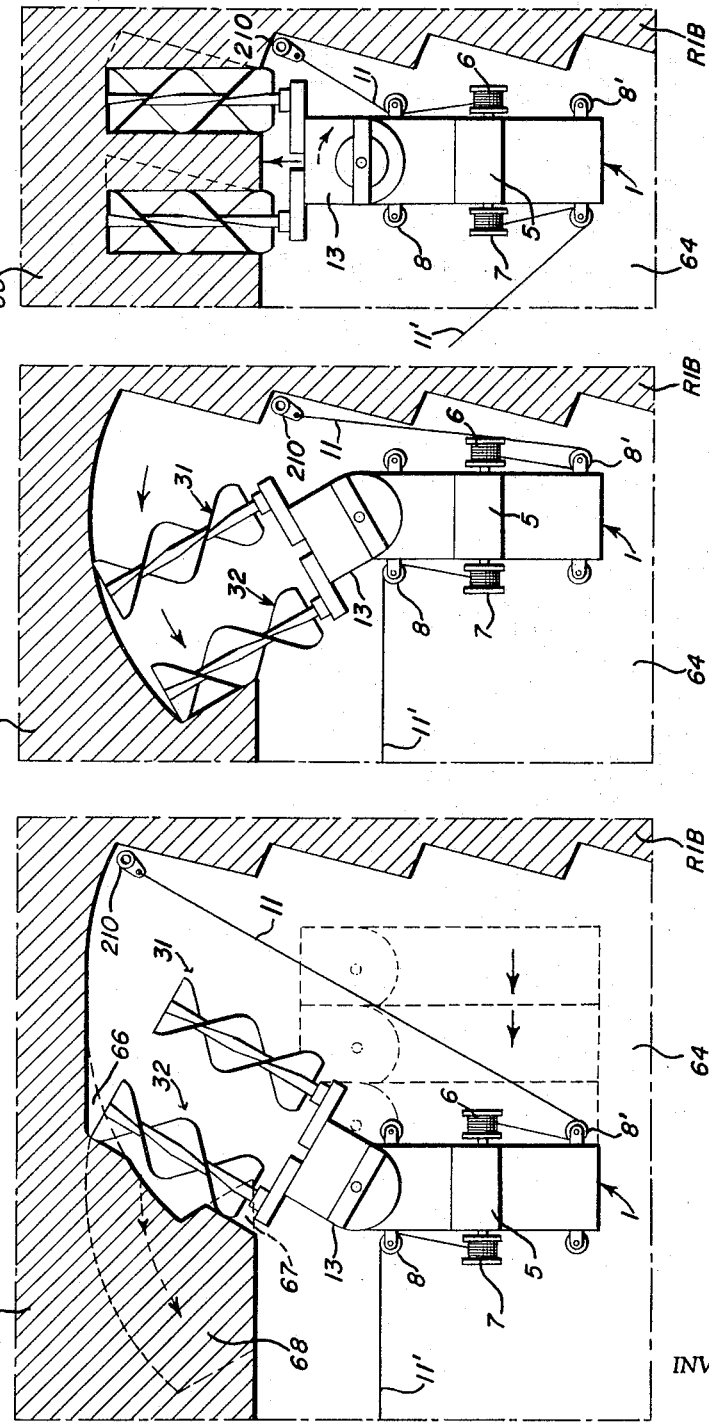

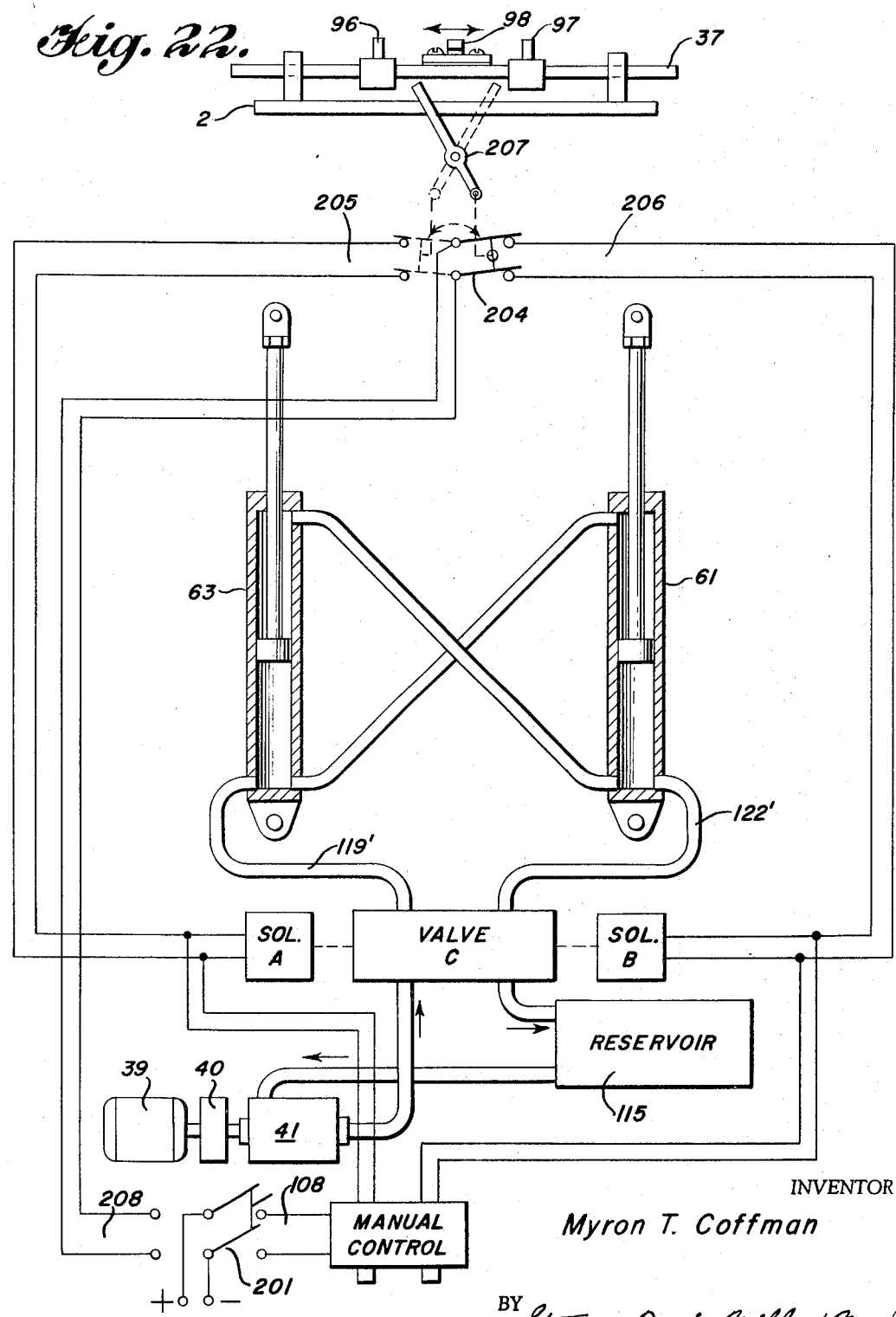

United States Patent Office 3,304,123
Patented Feb. 14, 1967

3,304,123
SIDE CUTTING MINING MACHINE HAVING
SWINGABLE AUGERS
Myron T. Coffman, Ellamore, W. Va.
(French Creek, W. Va. 26218)
Filed July 20, 1965, Ser. No. 477,344
10 Claims. (Cl. 299—45)

This invention relates to improvements in continuous mining devices used for the continuous cutting down and removal of coal or other mineral from a seam deposit and more particularly to a continuous mining machine that mines transversely across the face in a room or corridor in a coal mine as distinguished from known borer and ripper-head and arc wall types of continuous mining machines. This application is a continuation-in-part of my copending earlier application Serial No. 831,669, filed August 4, 1959, and now abandoned.

It is an object of this invention to provide an improved continuous mining machine of extremely shallow depth.

Another object of this invention is to provide a machine which will cut and load coal from low seams, as well as coal from medium high seams.

Another object of the present invention is to provide a machine that will mine its rated capacity from a thin seam of coal, as well as from a thicker seam.

Another object of this invention is to provide a machine, the volume output of which will not be limited by the characteristics of the seam being mined, be it hard or easy to tear or cut from the seam.

A further object of the present invention is the application of a controlled "crowd" feed for the cutter or disintegrating heads expediting the transverse movement of the machine.

A still further object of this invention is the provision in combination with a "crowd" feed of means that can keep the face being mined, on the bias, and cut it on the bias thereby producing a better size distribution of the resulting product, with lesser energy requirements.

Another object of this invention is to provide a machine versatile enough that it will position the cutter heads ahead of the gathering conveyor following, if conditions warrant, and assure positive leading of the intake end of the conveyors.

A further object of my invention is to provide a machine for mining coal faster or ahead of the machine as it skids across the face being mined.

Yet another object of the present invention is to provide a hydraulic control system for mining machine for hydraulically orienting, automatically and/or by remote manual manipulation of controlling valves, a turret or turn-table carrying cutter heads which are hydraulically raised or lowered while parallel to the frame or oblique thereto.

These and other objects of my invention will appear as the following specifications proceed by reference to the accompanying drawings, the novel features and combinations being set forth in the appended claims.

In the accompanying drawings:

FIGURE 1 is an assembly drawing showing schematically the several controls for the mining machine of the present invention;

FIGURE 2 is a fragmentary side elevational view of the mining machine;

FIGURE 3 is a fragmentary longitudinal sectional view through a portion of the mining machine with certain of the parts shown in elevation;

FIGURE 4 is a top plan view of the mining machine of the present invention with the rearward portion thereof broken away, the view also showing an attached scraper blade;

FIGURE 4a is a fragmentary side elevational view of the front portion of the mining machine showing the method of attaching the scraper blade;

FIGURE 5 is a top plan view of the rearward portion of the mining machine of my invention;

FIGURE 6 is a plan view of the forward portion of the mining machine, this view forming a continuation of the view shown in FIGURE 5;

FIGURE 7 is a transverse sectional view taken substantially on line 7—7 of FIGURE 2;

FIGURE 8 is a fragmentary top plan view showing one of the drives and the associated control means for one of the augers of the mining machine, the view being shown on an enlarged scale;

FIGURE 9 is an end view of the drive mechanism shown in FIGURE 8, taken substantially on line 9—9 of FIGURE 8;

FIGURE 10 is a transverse sectional view taken on line 10—10 of FIGURE 8;

FIGURE 11 is a longitudinal sectional view through the auger drive taken on line 11—11 of FIGURE 8, and showing a portion of the conveyor mounted therebeneath;

FIGURE 12 is a transverse sectional view taken substantially on line 12—12 of FIGURE 4, illustrating the manner in which the augers may be controlled independently, the view being shown on a somewhat enlarged scale;

FIGURE 13 is a view similar to the view illustrated in FIGURE 12, but showing the control means for the augers both positioned normally;

FIGURE 14 is a fragmentary transverse sectional view through the turret or turn-table illustrating the manner in which the turn-table of turret is locked or keyed to the chassis of the mining machine;

FIGURE 15 is a schematic plan view showing the augers aligned for head-on operation into the coal;

FIGURE 16 shows the turn-table or turret oriented in the maximum direction toward one side of the machine;

FIGURE 17 shows the turret or turn-table oriented in the maximum position at the other side of the machine;

FIGURE 18 is a top plan view of the forward portion of the mining machine of the present invention, particularly showing in more detail the turn-table or turret oriented in the maximum left position as shown in FIGURE 19;

FIGURE 19 is a top schematic view showing the mining machine sumped into a face, adjacent the side of a room, ready to traverse the face from right to left;

FIGURE 20 is similar to FIGURE 21 but showing the cutting heads being crowded toward the left to cut the coal before the machine itself begins moving towards the left;

FIGURE 21 is a schematic view showing the mining machine further along in the sequence of FIGURES 19 and 20 and particularly showing the cutting heads swung to the right ready to be crowded into the coal again in a leftward swing as the machine advances to the left after the last cutting operation, and FIGURE 22 is a simplified diagrammatic showing of the electric and fluid circuits for operating the machine automatically or semi-automatically.

The present invention is to provide improvements over known transverse mining machines, providing structural differences and application making for more expeditious continuous mining as well as means for positive loading and cleaning up in the mining process.

This invention is directed to a construction of continuous mining machines, the capacity of which is not governed by the thickness or thinness or hardness or softness, or grindability index number of the seam of coal being mined.

The machine of the present invention provides a controlled crowd feed or supplemental controlled thrust for cyclically sumping and retracting a pair of angularly adjustable cutter heads.

The machine of my invention provides a longitudinally extending support for a central conveyor for receiving the disintegrated coal mined by a pair of augers which are mounted over the end of the conveyor and adapted to be driven and repeatedly oriented in position for effectively cutting the face of the coal. The main frame of the machine is mounted for skid movement across the face of the coal for advancing the augers longitudinally and transversely of the coal. Appropriate drums and pulleys and associated draw cables are provided on the machine for enabling the machine to propel itself into cutting position against the face of the coal. The forward end of the machine on which the disintegrated coal is collected by the conveyor supports a turret or turn-table on which the angularly adjustable cutter heads are mounted. The turret or turn-table is orientable enabling the cutter heads to be moved into position for cutting the coal from the seam. The successive thrusts imparted to the cutter heads in the machine of my invention enable the machine to traverse the working place and disintegrate the coal in a shorter increment of time than heretofore possible.

Pivotally mounted guide plates may be mounted on opposite sides of the turret or turn-table of the machine adjacent the throat of the conveyor to insure a more positive loading of the disintegrated coal onto the conveyor. These guide plates may be vertically hinged on the forward end of the main frame or skidable base pan and pivotally connected to brackets on opposite sides of the turret or turn-table so that as the turret or turn-table turns on its pivotal axis the guide plates are concurrently moved therewith to direct coal onto the conveyor.

For further cleaning up the disintegrated coal that is left by the cutter heads, a plate may be attached manually from each of the pivotal arms, if desired. These plates would move with the turret or turn-table, extending the length of the auger immediately behind the following auger in the path of the auger.

The augers are raised and lowered by hydraulic cylinders vertically disposed in opposite positions on the turret or turntable between the sets of arms through which the countershafts to the cutter heads rotate. The turret or turntable is oriented by hydraulic jacks extending longitudinally on opposite sides of the frame while the augers are raised and lowered by the hydraulic cylinders in opposite positions on the turret or turntable operating on the arms that support the auger. The hydraulic cylinders are manipulated up and down under control of manually operated valves located in a control position on the frame of the machine and the hydraulic jacks are controlled for moving the turret or turntable from side to side by hydraulic valves operated automatically by the movement of the turntable and/or by the operator.

The electric motor for driving the augers is mounted centrally of the frame of the machine and imparts movement to the augers through a shaft which drives an assembly of gears included within the arms which support the augers.

The motor in addition to the aforesaid drive of the cutter heads provides a rearward drive to the cable feed drums through a transmission case for feeding and paying-out the cable as the frame of the machine is moved in the process of mining.

The turret or turntable which pivots on a vertical shaft of the machine carries a radially disposed arm which has limited angular orientation in a horizontal plane between a pair of adjustably movable limit stops carried on a transversely disposed rod which terminates at opposite ends in magnetic cores adapted to enter the hollow tubular cores of transversely disposed solenoids which may be selectively energized from a remote position, for the manual manipulation of the turret or turntable and the trapping of fluid in the hydraulic system.

A valve rod extends transversely of the frame of the machine in a position connected with the aforesaid rod. This last-mentioned rod forms part of a pair of conventional hydraulic valves which are provided with the usual inlet connections for introduction of fluid and outlet connections for retrieving the fluid from the hydraulic jacks disposed on either side of the machine for turning the turret or turntable and its associated equipment. These valves control the operation of the hydraulic jacks on opposite sides of the frame of the machine for sumping and withdrawing arcuately in a horizontal plane the augers in the mining operation.

The drive shafts for the mining heads accommodate any type of cutter head, preferably a double scroll or double twist auger bit less the feed threads, carrying cutter bit holders across the diameter of the augers.

Cutter heads of this type are well known and need not be further described herein.

Referring to the drawings in more detail, the mining machine is provided with a base which is skidded into position under control of anchored cables which are rolled upon cable drums mounted on the frame of the machine during operation. The base is shown at 1 supporting plates 2, 3, and 4 secured over the top of the open pan forming the base 1 and fastened where the plates lap over the sides of the frame 1 by machine screws. The plates 2, 3 and 4 respectively form the base for the turntable of the machine, the base for the motor frame, and the base for the gear box. The gear box is designated at 5 driven from motor 12 which drives the rim gear 25 and also the wire rope or feed cable drums 6 and 7. The frame of the machine is provided with pulleys 8 and 8' to accommodate and direct the feed cable in the conventional manner. The wire rope or cables reeled upon the drums 6 and 7 are indicated at 11 and 11'. The turntable driven by the hydraulic jacks on opposite sides of the frame of the machine is designated at 13. The central vertically disposed shaft on the machine is indicated at 14. Reference character 15 designates a worm quill attached to rim gear 25 and driving the worm gears 16 which drives shafts 23 and 24 through bearings 19 and 19', bearing arm assemblies 20 and 21 and bearings 22 and 22'. The drive shafts end with spur gears 9 and 9' in gear housings 33 and 34 where, through intermediate gears 10 and 10', and drive gears 29 and 30, they drive cutter head shafts 27 and 28 to which are removably attached, through their hubs, cutter heads 31 and 32. To effect the removable attachment of the cutter heads with the hubs there is provided flanged couplings 26 and 26' on the attaching ends of the cutter heads 31 and 32, respectively, which receive the tapered ends of drive shafts 27 and 28 and are bolted to the hubs 27' and 28', respectively secured thereon.

As shown in FIGURE 7, the vertically disposed shaft 14 is threaded into plate 2. A thin, hard metal plate 17 is provided fitting around vertical shaft 14, on one end thereof, under the worm quill 15 and on top of bearing 18, and on the other end thereof it is journaled in frame 36 of the turntable, whereby shaft 14 is maintained vertically erect.

The pumping means for the pressurized hydraulic fluid, preferably oil, which is employed in the hydraulic system of the present invention, is shown at 39, 40, 41 and 115 in FIGURES 1 and 5, where motor 39 drives hydraulic pump 40 through a gear reduction and clutch, 41. Reference character 115 represents the storage tank or resrvoir for the hydraulic fluid.

The frame of the machine is provided with hinged plates 33' at the opposite sides of the front of the frame adjacent the intake end of the conveyor, the plates 33' being movable in accordance with the direction of operation of the mining machine. Each plate 33' is provided with a clevis into which a connecting rod 34' is pivotally fitted by a pin secured by a cotter key. The other end of the connecting rod is attached to an arm 35 extending down from the bracket 126, 124 which holds the piston parts of the hydraulic jacks 61 and 63 on opposite sides of the frame 36 of the turntable 13. As these jacks move forward to swing the turntable base 13 of the machine, together with the machinery mounted thereon, this movement also swings the plates 33' so that, at the end of the swing, the swing plates have swept the coal up against and onto the projecting conveyor at the gathering end of the conveyor indicated at 70. The plates 33' serve as abutments against which the accumulations of the disintegrated coal stack and are gathered onto the conveyor system for delivery to the rear of the mining machine.

To give a more thorough cleaning of the pavement in the mining operation a manually attachable and detachable scraper blade 42 is provided to follow the cutter head which follows the lead cutter head. Scraper blade 42, which extends the length of the auger, is attached to the arms 33 and 20 which control cutter head 31, as shown in FIGURES 4, 4a and 12. The scraper blade is mounted in close spatial relation with the auger but arranged to clear the cutting bits attached thereto. In these drawings the machine is presumed to be mining to the left so that cutter head 31 is following cutter head 32, thus, scraper blade 42 follows the path of auger 31 and directs the cuttings to the adjacent conveyor 71 as shown in FIGURE 12.

The scraper blade 42 is provided with an attaching arm 44 which extends adjacent arms 33 and 20 and is attached thereto. Arm 33 is provided with protrusions 45 which extend through holes in attaching arm 44 and securely hold it in position with pins inserted through protrusions 45 as shown at 46. Arm 20 provides eye hinges 47 protruding therefrom and permit insertion therein of hinge hooks 48 carried on attaching arm 44. Thus the scraper blade is rigidly held to arms 20 and 33. Arms 34 and 21 are also provided with like attaching means for a scraper blade when the machine is mining to the right. This arrangement of scraper blade is easily attachable and detachable and when used in combination with the foors or swing plates 33' results in a thorough clean-up in the mining operation. Optionally, scraper plate may be made sectional so as to telescope when not in use.

The conveyor consists of endless conveyor 71 and endless conveyor 72 driven by transverse shaft 73 terminating in worm wheels at opposite ends of the shaft which are driven by worms 74 and 75 driven by motors 76 and 77 operating through gear boxes 78 and 79. The conveyors 71 and 72 have drives a different set of flights of the scraper type for driving the disintegrated coal. This is best shown in FIGURE 5.

The turntable 13 carries journaling means for sets of arms which consist of the gear housings or arms 33 and 34, heretofore explained, and a co-acting set of bearing arm assemblies 20 and 21 extending parallel to but spaced from the aforesaid arms. The bracket which supports the gear housing arm 33 is indicated at 80, while the adjacent bracket supporting the bearing arm 20 is indicated at 81. These brackets are spaced sufficiently to permit the raising and lowering mechanism to extend therebetween as indicated by hydraulic cylinders 82 and 83. These hydraulic cylinders 82 and 83 are pivotally mounted on turntable 13 as indicated at 82a and 83a, as shown in FIGURE 12, and contain intake and retrieving connections for fluid at opposite ends thereof for controlling the movement of the associated pistons and piston rod assemblies indicated at 84 and 85 connected to journals 86 and 87 fastened to the associated brackets 80 and 81 on the one side and 90 and 91 on the other side. In each instance one of the arms on these assemblies is a strengthening or reinforcing arm (20, 21), while the other arm constitutes the gear housing (33, 34) by which the cutter heads are driven from shafts 23–24 at the same time that the shafts of the cutter heads are capable of being raised or lowered by operation of the hydraulic units 82 and 83. The hydraulic units occupy the space between the brackets 80 and 81 and the brackets 90 and 91, as best seen in FIGURE 6, so that a symmetrical force is delivered to the arm assemblies through the supporting brackets for raising and lowering the arm assemblies under hydraulic control for setting the cutter heads in the required positions for cutting the coal from the face of the coal in the mine. When the desired width of the face is reached the skidding movement of the machine is stopped. Then the leading auger, which is the top one, is lowered while in an oblique position to frame the niche in the rib line. When cutting the face of coal the augers remain in the raised and lowered positions, respectively, to which they are set before the cut.

The orientation of the turntable 13 is controlled by admitting hydraulic fluid selectively to the jacks 61 and 63 as heretofore explained. There are occasions in which it is desirable for the orientable turntable 13 to remain in fixed position with respct to the frame of the machine, in which event I provide an arrangement of pins 62 which may be inserted through aligned apertures in the plate 2 of the frame of the machine shown at 92 and 93 when corresponding apertures 94 and 95 in the turntable permit the insertion of the pins therethrough, thus locking the turntable in position to enable the machine to be moved with the cutter heads in a predetermined position with respect to the frame of the machine as best shown in FIGURE 14. In this locked position the fluid in the hydraulic system is trapped in the hydraulic system. This will be understood more fully after reference to the operative description of the hydraulic system hereinafter following. This locked condition of the turntable and the frame of the machine may be interrupted by withdrawing the pins from the aligned apertures between the turntable and the frame, thereby enabling the turntable to be oriented freely with respect to the frame of the machine.

Valves designated at 111 and 112 are three connector sliding-spool type valves normally closed by springs 200, 200' and solenoidally controlled.

The spool is divided into separate chambers to match the ports in the fixed chamber. As the spools are moved back and forth through a normally closed position, they permit fluid to pass through some ports and prevent flow through others. The spools in the valves are connected by rod 109, which is connected to a parallel rod 37 by arm 110. Thus rod 37 becomes a pilot of spool rod 109.

In FIGURE 1 of the drawings: When rod 37 is moved endwise to the left, the valves being so positioned in relation to each other, close port 118 and open port 120 providing for the retrieving of spent fluid from fluid cylinder jack at 63 through the depressing of the piston of said jack to return line 127, at the same time in valve 112 port 123 is closed and port 121 is opened for the flow of pressurized fluid from reservoir 41 through line 117 and ports 121 and 122 of valve 112 through conduit 122' to the cylinder end of jack 61. Since the hydraulic jacks at 63 and 61 are pivotally attached to the frame and pivotally attached to the turntable at bracket 124 and bracket 126 respectively, the pressurized fluid entering the cylinder end of jack 61 acts against the piston, therein pushing the piston forward, swinging the turntable and thereby rotating cutter heads in a horizontal arc to the left at the same time, repressing the piston end of jack at 63 as aforesaid. When rod 37 and thereby spool rod 109 is moved to the right, port 121 is closed, port 122 opened and port 123 opened in valve 112, while in valve 111 port 120 is closed 119 and 118 opened to permit the flow of pressurized fluid from the hydraulic system, through to the piston end of fluid jack 63, pushing the piston thereof forward, thereby swinging the turntable to the right. As mentioned, the normal position of the valve spools is closed so the valve rod will return to a mid-position between the right and left when released from being moved either right or left. When the spools assume this closed position in the valve chamber, the hydraulic fluid is trapped in the cylinders of jacks 61 and 63 of the turntable and thereby the cutter heads may be held in an adjusted position in the horizontal pivotal plane.

Solenoids at 101, 102 at the left and 103 and 104 at the right ends of pilot rod 37 move the rod 109 sliding the spools in the chamber of directional flow valves 111 and 112 positioning them to function as aforesaid.

The ends of rod 37 end in metal cores at 99 and 100. These cores are in two parts insulated from each other. The inside part of core 99 is within the magnetic attracting field of solenoid 102 the outside end, not shown, is within the field of solenoid 101 and is shielded from solenoid 102. The two cores at 100 are in the same relation to solenoids 103 and 104, respectively. The solenoids are so spaced in relation to each other and the cores that either solenoid 101 or 102 will move rod 37 to the left. When relieved of the magnetic attraction of either solenoid, rod 37 will move to the right from the spring offset in the valves, it is then in controllable position for solenoid 103 or 104, either of which, when energized will move the rod to the right repositioning the valve spools.

Power source 108 brings electric current to switch box 106 at which are two electric switches 129 and 130. Solenoid 102 is energized by closing switch 129 and is de-energized by opening it. Solenoid 103 is energized by closing switch 130 and de-energized by opening it.

Switch box 105 receives electric current from power source 108 and the switches 107 and 125 energize and de-energize solenoids 101 and 104 respectively, in the same manner.

Stops shown at 96 and 97 and the arm or fork at 98 have no function in the manual operation of the swinging of the turntable and the cutter heads which is correlated by the operator with the movement of the mining machine across a face in the mine. They may be used is desired for tripping an electric switch upon movement of arm 98, which in turn controls directional flow valves to swing the table automatically, coacting with the movement of the machine when mining and/or make the swinging of the turntable dependent upon the movement of the machine when mining, as shown in FIGURE 22. Referring more particularly to FIGURE 22, in which elements corresponding to those in FIGURE 1 are designated by like numbers, switch 201 provides power for manual control in one position and for automatic swinging of the cutter heads when in the other. In the automatic position, power is provided through line 208 to the switch 204 actuated by toggle 207. Toggle 207 is mounted upon the base of the machine adjacent rod 37. Rod 37 is moved to the right or left, respectively by engagement of fork 98 with the stops 97 or 96 as turntable 13 swings. The extent of angular movement of the turntable for this engagement is determined by the position of the stops 96 and 97 on the rod 37. In the right hand position of switch 204, solenoid B is energized. Solenoid B (corresponding to solenoids 103 and/or 104 in FIGURE 1) through the associated mechanical linkages indicated by the dotted lines but which are shown in detail in FIGURE 1, actuates hydraulic valve C (corresponding to valves 111 and 112 of FIGURE 1) permitting hydraulic fluid to flow through line 122' to the piston end of jack 61.

Upon reaching the end of the swing of the turntable, or any predetermined intermediate angular position, in one direction, fork 98 engages one of the stops, 96 or 97 as the case may be, and thereby moves rod 37. This movement of fork 98 and rod 37, with stops 96 and 97 concurrently flips toggle 207 and its associated switch 204. Flipping switch 204 serves to break the circuit to one of the solenoids A or B and simultaneously to energize the other. In this manner, turntable 13 is alternately moved to the right or left in a predetermined sequence without the intervention of the operator.

In the above disclosure it is obvious that the laterally spaced hydraulic jacks can be conventional pistons and cylinders and have their cylinder ends connected to the piston ends of the opposite fluid cylinder as indicated in FIGURE 22, for more efficient application of force to feed the cutter heads in a horizontal plane in mining. It is also obvious that the solenoids controlling the directional flow valves could be in the envelope of the valves 111 and 112, if desired.

Referring more particularly to FIGURES 19, 20 and 21, the machine being rope-propelled is brought to a working position adjacent the face to be mined and at right angle to the face to be minded and at right angles to the face with the heads nearest the face, by manipulating the clutches of the winch 5, the clutches supplying torque selectively or at the same time, to turn rope drums at 6 and 7.

The machine is at a point not less than the distance between the centers of the cutter heads from the nearest rib of the working plane. Wire ropes 11 and 11' are already attached to the bottom of roof-jacks, each of which is in a niche, cut on the previous pass, in the rib lines. For convenience, only the roof-jack 210 in the right-hand rib is shown. Two roof-jacks with snatch blocks attached at their bottom ends are temporarily set up near the face of the seam on either side of and close to the front end of the machine. Ropes 11 and 11' are slacked off and are reeved about the snatch blocks on their respective side of the machine. The cutter heads are now raised to the desired position in their pivotal arc by manipulation of valves at 133 and 134 and positioned there by trapping the hydraulic fluid in the respective cylinders. By means of the clutches in winch 5 both rope drums are feed drums at this time, winding the wire ropes onto the drums, thereby forcing the machine forward sumping the rotating cutter heads into the coal to the desired depth.

The jack-pipes used in sumping in are taken down and the machine being nearest the right hand rib, the wire rope on that side is reeved about the sheave attached the front of the machine frame on that side and serves as a feed rope. The clutch breaking torque to the tail rope drum is tightened. The machine being in the position shown in FIGURE 19, the clutch in winch 5 communicating driving torque to the feed drum on the right is tightened to the extent that the machine moves to the right and the cutter heads mine coal. Confining the swinging of the turntable and thereby the rotating cutter heads to the manipulating switches in switch-box 106; switch 130 is closed swinging the turntable arcuately to the right. At about the time the machine is stalled by the slipping of the winch clutch, switch 130 is opened and switch 129 is closed swinging the turntable to the left. Released of the crowd feed of the arcuate sumping of the heads the machine continues to move to the right until its progress is again slowed down by crowding the cutters by manipulaion of switch 130 to a closed position. The back swing may be stopped at any position in its arc, as before noted. When the projected rib line is reached, the feed clutch is adjusted to hold and the heads are crowded to the right by manipulation of switch 130 to a closed position, when the arc is of the desired width switch at 130 is opened. Valves 111 and 112 return to a closed position and the heads are thus positioned by the hydraulic fluid to be trapped. The right handed cutter head 31 is then forcibly lowered to the pavement by admitting pressurized fluid into the piston end of cylinder 82 and allowing spent fluid to flow from the cylinder end thereof by the manipulation of valves 133 or 134. Thus a niche is cut at the rib line into which a jack-pipe can be erected. If a niche for this purpose is not cut the rib lines will eventually converge.

The electric circuit at switch 129 is now closed swinging the heads to the left where the swing is arrested at any point desired. The tail rope off drum 7 is now slacked out and reeved about the sheave at the front end of the frame on the left side of the machine. The machine through the clutches of the winch 5 is skidded to the left away from the niche just cut. The wire rope from drum 6 on the right hand side is slacked and reeved about the sheave at the right rear side of the machine and is attached to the bottom of its jack-pipe which is reset in the niche just cut, the rope now becoming the tail rope, as shown in FIGURE 20. Scraper blade 42 is now attached to arms 33 and 20 by an eye and hook hinge and a keeper pin to through the coal about the following or clean up auger 31. The clutches of the winch are adjusted to move the machine to the left along the face. Switch 129 in switch box 106 is closed crowding the cutters in an arc to the left as the clutch slips pressure swinging the heads to the left is released by opening switch 129 and closing switch 130. While the heads are swinging back to a straight, or a little to the right of straightaway the machine has moved to the left as the pull on the feed rope is constant, and a part of the wedge-shaped coal left from the left hand swing is cut as the heads are brought back, as shown in FIGURE 21.

This is repeated across the width of the face being mined. When the rib line is reached the leading head is crowded in the rib cutting a niche, it is then lowered to the pavement while in this oblique position by the action of hydraulic cylinders 82 and 83 through control valves 133 and 134. After removing the scraper blade the machine is skidded to the right from the rib line and is again sumped in for another pass across the face in the opposite direction, repeating the previously described procedure.

To recover the biggest percentage of coarser coal, mining by this method, it is obvious that the wider the arc cut on a prior pass of the cutter heads, the more pea and nut size coal will be recovered by the subsequent pass through the wedges left by the prior pass. It is also obvious that the operator has a choice as to the depth of the arc best suited to the characteristics of the seam being mined.

In FIGURES 19–21 the progression of the mining machine as it mines from right to left across a face of coal is illustrated. First the augers are positioned in their vertical plane to accommodate the height of the seam being mined, and are hydraulically locked in this position. Then the machine is advanced into the face of coal, as previously described. FIGURE 19 shows the mining machine sumped into the face, adjacent the rib or side of the room 64, preparatory to cutting the niche in the right rib. FIGURE 20 shows the heads being crowded to cut the coal on the first swing to the left along the face. As the turntable 13 turns the heads to the right the machine moves steadily from right to left so that when the turntable again swings toward the left the heads are again crowded into the work due to the progressed position of the machine toward the left.

FIGURE 21 shows the mining machine after it has progressed some distance to the left and is shown in a position such that the augers will cut-out the dotted area shown in the face 65 as the turntable 13 swings to the left. The augers as they progress on their swing will cut the coal wedges indicated at 66 and 67 and then will proceed to cut-out the wedge 68. It is evident that these wedges of coal will cut with relatively little effort since they do not present as much resistance as a solid flat face of coal. Thus, the leaving of the wedges of coal by one cut and then cutting them on a sweeping bias on the next cut lends itself to a continuous cutting operation with no slow-ups as the machine is skidded across the face on the pavement adjacent the coal face. Thus, since the machine of the present invention can cut wedges of coal on the horizontal plane on a sweeping bias it makes the mining of a coal seam with a low grindability index (hard to mine) possible and efficient.

It is obvious that power to crowd the cutter heads a' into the coal, can be achieved by mounting the hydraulic cylinders at different points on the main frame and the pistons attached to the turntable at different points than those shown.

The supplemental force applied laterally to the cutter heads, resulting in crowd feeding of the cutter heads, as set out in this application is a significant improvement whereby the more rapid mining of coal by a transverse mining machine is effected.

As is well known in the art, the cutting means and the drive means may be modified from that shown, while the means for turning the drive shafts and thereby the disintegrating heads, may be mounted on the turret or turntable part of the machine above-described, rather than adjacent to it. The means, other than that described, could be hydraulic motor or motors, an electric motor or motors, mounted on the bottom plate of the turret, and moving with it as it is directed through its pivotal arc in the process of mining.

It should be understood, of course, that the foregoing disclosure relates to only a preferred embodiment of the invention and that it is intended to cover all changes and modifications of the example of the invention herein chosen for the purpose of the disclosure, which do not constitute departures from the spirit and scope of the invention.

What is claimed is:

1. A mining machine comprising a frame having a skidable base, means for progressively moving said base horizontally in a direction transverse thereof, conveyor means mounted on said base and extending longitudinally of said frame, a turntable pivotally mounted adjacent the front of said frame and movable in a horizontal plane, hydraulic control means mounted at opposite sides of said frame and connected with said turntable for controlling the orientation of said turntable, a set of arms mounted adjacent the front of said turntable, a cutter head journaled in each of said arms on axes substantially parallel with the longitudinal axis of said turntable, means carried by said arms for rotatively driving said cutter heads and means carried by said frame for driving all of the aforesaid means.

2. A mining machine as set forth in claim 1 in which the pivotal mounting for said turntable adjacent the front of said frame consists of a vertically extending shaft journaled in a step bearing carried by said frame, enabling said turntable to swing arcuately in a substantially horizontal plane above the front end of said frame.

3. A mining machine as set forth in claim 1 including means for selectively fixing said turntable in any predetermined position thereof for maintaining said cutter heads on operating axes in fixed relation to the longitudinal axis of said frame.

4. A mining machine as set forth in claim 1 in which said arms mounted adjacent the front of said turntable comprise pairs of spaced parallel levers which are pivoted at their lower ends on said turntable and wherein there are means carried by said turntable and extending between each of said sets of arms and pivotally connected with said arms for selectively raising and lowering said arms for selectively fixing the position of the axes on which said cutter heads operate, and means for controlling the raising and lowering of said arms from the same position at which control of orientation of said turntable is effected.

5. A mining machine as set forth in claim 1 in which a turntable carries a centrally located arm in a position opposite the aforesaid set of arms and electrical means co-acting with said centrally located arm for controlling the swinging of said turntable.

6. A mining machine as set forth in claim 1, which includes a pair of hydraulic reversing valves connected to control hydraulic pressure to said hydraulic control means mounted at opposite sides of said frame and means controlled by the orientation of said turntable for controlling the position of said reversing valves for correspondingly controlling the swinging of said turntable.

7. A mining machine as set forth in claim 1 in which the means for controlling the orientation of the turntable includes means for returning said turntable to its initial position upon traverse through a predetermined arc.

8. A mining machine comprising a frame having a portable base, means for progressively moving said base transversely thereof along a working face, a turntable having a front edge thereon pivotally mounted adjacent the front of said frame and orientable in a horizontal plane, cutter head driving means mounted on and orientable with said turntable, a pair of spatially related cutter heads extending from said cutter head driving means and extending beyond the front edge of said turntable, a pair of hydraulically actuated pistons pivotally connected to the frame on either side of said turntable, and means actuated by said turntable for controlling fluid flow to said pistons as the base of the machine progresses a predetermined distance along said face, said means comprising a toggle switch selectively energizing a first solenoid and a second solenoid, said first solenoid and second solenoid each actuating a valve admitting fluid to one of said pistons, thereby intermittently swinging said turntable and said cutter heads in the horizontal plane for the crowd feeding of said cutter heads into said face as the base progresses along said face.

9. A mining machine as set forth in claim 8 in which the means for intermittently swinging said turntable comprises a pair of hydraulic jacks mounted on said frame and connected to diametrically opposite sides of said turntable, valves for controlling the flow of operating fluid to said jacks, solenoids for selectively actuating said valves and means responsive to the position of said turntable for energizing said solenoids.

10. A coal mining machine comprising a frame, a turntable pivotally mounted on the forward end of said frame and rotatable in a horizontal plane, power means on opposite sides of said frame for rotating said turntable through a predetermined arc, a set of coal cutting means mounted at the forward end of said turntable and extending outwardly thereof, power means for driving said cutter means, means for moving said frame and means mounted thereon progressively in a transverse direction, and control means for intermittently actuating said turntable rotating means whereby said turntable is moved in an arcuate path in the direction of movement of said frame said control means comprising a pair of solenoids each selectively actuated by said turntable at a predetermined angular position thereof.

References Cited by the Examiner
UNITED STATES PATENTS 2,841,379    7/1958    Driehaus _____ 299—1
2,967,701    1/1961    Wilcox _____ 299—73 X ERNEST R. PURSER, *Primary Examiner.*

CHARLES E. O'CONNELL, *Examiner.*